United States Patent Office 3,810,870
Patented May 14, 1974

3,810,870
AROMATIC POLYETHERS
Ronald George Feasey, Knebworth, and John Leslie Freeman, St. Neots, England, assignors to Imperial Chemical Industries Limited, London, England
No Drawing. Filed May 12, 1972, Ser. No. 252,555
Int. Cl. C08g 23/00
U.S. Cl. 260—47 R                                   13 Claims

ABSTRACT OF THE DISCLOSURE

A polymer is provided having recurring units of the formula

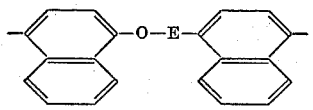

where E is preferably a direct link or may be a group having the formula —X—O— where X is divalent non-polar residue.

---

This invention relates to aromatic polyethers.

According to the present invention, a polymer is provided having recurring units of the formula

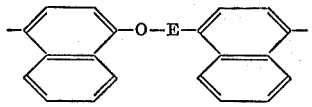

where E is a direct link or a group having the formula —X—O— where X is a bivalent non-polar residue. Preferably E is a direct link.

The aromatic hydrogen atoms of the naphthoxy residues may be replaced by any other monovalent atoms or groups, if desired, so long as they are inert to the polymerization, e.g. alkyl aryl, alkoxy or aryloxy groups. Groups containing not more than 3 atoms other than hydrogen or fluorine are preferred so that steric interference with the polymerization reaction is minimized. The naphthoxy residues may be the same or different.

When E is not a direct link but has the formula

—X—O—

X is a non-polar bivalent aromatic or aliphatic residue containing up to 20 carbon atoms; suitable groups include linear polymethylenes having the formula $\text{-(CH}_2\text{)}_n\text{-}$ where $n$ is 2 to 12, all their alkyl and dialkyl derivatives to a maximum total of 20 carbon atoms, and phenylene, naphthylene and biphenylylene residues (e.g. o-, m- and p-phenylene, 4,4'- 2,2'-, 2,4'- and 3,4'-biphenylylene) and oxy- and alkane-bis(phenyl) residues. Linear polymethylene, and propane-2,2-bis(4-phenyl) groups are preferred.

Polymers according to the invention may be prepared under mild reaction temperature conditions of —50° C. to +60° C. (preferably —50° C. to +50° C.; more preferably —20° C. to +20° C.) (—20° C. to +20° C. is a preferred range) from at least one bis(1-naphthoxy) derivative of the formula

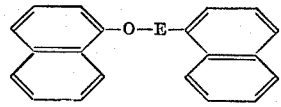

in the presence of an electrophilic chemical system and a hydrogen-abstracting reagent as hereinafter defined. A preferred bis(1-naphthoxy) derivative is

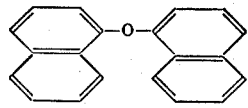

The reaction is preferably carried out in an inert atmosphere, for example nitrogen.

The polymerization reaction by which the thermoplastic polymers of the invention are prepared is a novel extension of the well known class of dehydrogenation condensation reactions of aromatics, which are described in the book "Friedel-Crafts and Related Reactions" by George A. Olah, vol. II, Part 2 Interscience 1964 (in Chapter XXIII entitled "Dehydrogenation Condensation of Aromatics (Scholl and Related Reactions)" by A. T. Balaban and C. D. Nenitzescu). The polymers are produced using catalysts and oxidants, described for example in the aforesaid mentioned chapter of Olah's book, well known for this class of reaction. Such catalysts include for example ferric chloride, aluminium chloride, antimony pentachloride, sulphuric acid and benzene sulphonic acid. In the present invention ferric chloride is a preferred electrophile. The oxidants include for example nitrobenzene, m-dinitrobenzene, cupric chloride, ferric chloride and oxygen. Cupric chloride and ferric chloride are preferred. Polymers of higher molecular weight are generally formed when both the electrophile and hydrogen abstracting oxidant are present in molar concentration greater than that of the bis(1-naphthoxy) derivative.

Whilst the polymerization reaction can be carried out as a bulk reaction it is more convenient to use a diluent. A useful diluent is nitrobenzene and it is important that the diluent should be essentially anhydrous.

The resulting polymer may be isolated, for example, by precipitation on addition of an inert volatile liquid for example methanol, followed by filtration, washing with water and/or a further quantity of an inert volatile liquid and drying in an oven, or by any other suitable method.

The polymers may be obtained in either amorphous or crystalline form.

A preferred polymer comprises repeat units having the formula

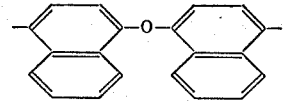

This polymer has good heat stability because no methylene groups are present and may be obtained in amorphous form.

The polymers according to the invention may be mixed with any desired fillers or reinforcing materials, lubricants and stabilizers and may be blended with other polymeric materials. They are thermoplastic, and as they have high softening points (up to 400° C.), they may be used in applications requiring prolonged exposure at high temperatures. Compositions of the polymers may be extruded into sheet or tube and the sheet calendered, pressed, drawn or vacuum-formed. The compositions can also be compression-moulded and injection-moulded. Also fibres may be drawn from a melt or spun from a solution of the composition. The compositions may also be used as thermoplastic adhesives. Films may be prepared by compression-moulding or extrusion or from solutions in for example nitrobenzene, 1-chloronaphthalene, anisole, dimethyl sulphoxide and N,N-dimethylformamide.

The invention is illustrated by the following examples.

EXAMPLE 1

Bis-(1-naphthyl) ether (5.40 g.; 0.020 moles) anhydrous ferric chloride (7.13 g.; 0.044 moles) and dry nitrobenzene (50 cm.³) were stirred together at 50° C. under a stream of dry nitrogen for 16 hours whilst hydrogen chloride was evolved. The resulting slurry was poured into vigorously stirred methanol (ca. 200 cm.³) and the polymer which precipitated was collected, extracted with hot methanol and then dried.

The polymer had repeat units of the structure

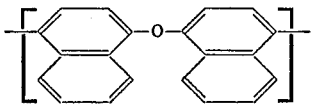

and had reduced viscosity 0.78 measured at 25° C. on a solution of the polymer in 1-chloronaphthalene containing 1 g. of polymer in 100 cm.$^3$ of solution (i.e. 1% w./v.). It was compression moulded at 400° C. into pale amber films.

EXAMPLE 2

1,3-di-(1-naphthoxy)propane (8.2 g.; 0.026 M), anhydrous ferric chloride (8.1 g.; 0.050 M) and nitrobenzene (50 cm.$^3$) were stirred together under nitrogen at room temperature for 2.5 hours. The resulting dark reaction mixture was poured into stirred methanol (200 cm.$^3$) and the resulting precipitate was collected, extracted with hot methanol and dried in vacuo to a buff powder (7.7 g.).

The powder was soluble in o-dichlorobenzene and nitrobenzene and had a reduced viscosity of 0.54, measured at 25° C. on a 1% w./v. solution in o-dichlorobenzene. The polymer was found on analysis to contain 84.4% carbon and 5.6% hydrogen and gave a nuclear magnetic resonance (N.M.R.) spectrum consistent with structure I (calculated: carbon 84.7%; hydrogen 5.52%)

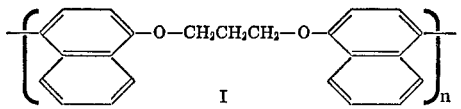

The powder was found to be amorphous on examination by X-rays and exhibited a glass-to-rubber transition at 171° C. when subjected to differential scanning calorimetry at a heating rate of 16 deg. C./min. The powder was found to become crystalline on X-ray examination when placed in refluxing xylene for 2 hours, and the resulting crystalline material showed a crystalline melting point of 278° C. when examined by differential scanning calorimetry at a heating rate of 16 deg. C./min.

Both the amorphous and crystalline forms of the product could be heated to a melt form from which silky fibres were drawn, and both forms were compression-moulded at 300° C. into thin films which had a density of 1.206 g./cm.$^3$.

EXAMPLE 3

1,3-di(1-naphthoxy)propane (3.3 g.; 0.01 M), anhydrous cupric chloride (2.7 g.; 0.02 M), anhydrous ferric chloride (0.32 g.; 0.002 M) and nitrobenzene (50 cm.$^3$) were stirred together under nitrogen at room temperature for 16 hours, whilst 0.018 M hydrogen chloride were evolved from the reaction mixture. The reaction mixture was poured into stirred methanol (100 cm.$^3$) and the off-white precipitate was collected, washed with aqueous ammonia of specific gravity 0.880 (2× 100 cm.$^3$ portions), water and methanol, and was dried to yield a product which had reduced viscosity 1.07, measured as a 1% w./v. solution in o-dichlorobenzene at 25° C.

EXAMPLE 4

1,2-di-(1-naphthoxy)ethane (6.3 g.; 0.02 M), anhydrous ferric chloride (7.0 g.; 0.04 M) and nitrobenzene (50 cm.$^3$) were stirred together under nitrogen at room temperature for 2.5 hours. The reaction mixture was worked up as described in Example 2 to yield a buff powder (5.9 g.) which was insoluble in boiling nitrobenzene, dimethyl formamide, dimethyl sulphoxide, o-dichlorobenzene, anisole and 1-chloronaphthalene.

The product was found to be crystalline to X-rays and showed a crystalline melting point at 277° C. when examined by differential scanning calorimetry at a heating rate of 16 deg. C./min. The product contained 85.9% carbon and 5.4% hydrogen and was found by infrared analysis to have a structure consistent with: (calculated carbon 84.6%, hydrogen 5.3%)

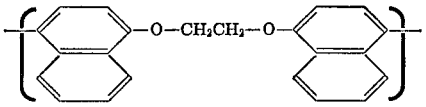

In a similar manner 1,4-di(1-naphthoxy)butane and 1,6-di(1-naphthoxy)hexane were converted into polymers which were crystalline to X-rays and which had crystalline melting points of 324° C. and 270° C. respectively, determined by differential scanning calorimetry at a heating rate of 16 deg. C./min.

EXAMPLE 5

1,5-di-(1-naphthoxy)pentane (17.84 g.; 0.05 mole), anhydrous ferric chloride (17.6 g.; 0.115 mole) and nitrobenzene (250 cm.$^3$) were stirred together under nitrogen for 18 hours at 20° C. The resulting polymer was worked up as described in Example 2 but using 600 cm.$^3$ of methanol.

The polymer was found by infrared and N.M.R. spectroscopy to have spectra consistent with the formula

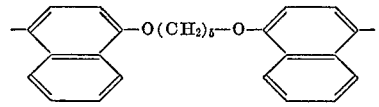

It was amorphous, as determined by X-ray crystallography, and exhibited a glass-to-rubber transition at 143° C. when subjected to differential scanning calorimetry at a heating rate of 16 deg. C./min.

The polymer was compression moulded at 300° C. into plaques, the polymer then having reduced viscosity of 2.95 (1% w./v. in 1-chloronaphthalene at 25° C.; reduced viscosity 6.16 before moulding) and an iron content of 1650 parts per million. The plaques had a notched impact strength of 31.80 kJ/m.$^{-2}$ (average of 7 tests).

EXAMPLE 6

The procedure of Example 2 was repeated except that the concentrations of 1,3-di-(1-naphthoxy)propane and ferric chloride were varied. The resulting polymers were compression-moulded into plaques and impact strength and reduced viscosity (1% w./v. at 25° C. in 1-chloronaphthalene) data are presented in the following table. Because the ferric chloride is both the electrophile and the hydrogen abstracting oxidant, the figure for percent mole excess expresses the excess in each function.

| Monomer (moles) | Ferric chloride (moles) | Molar excess of ferric chloride (percent) | Impact strength (kJ/m.$^2$) notched | Reduced viscosity |
| --- | --- | --- | --- | --- |
| 0.350 | 0.700 | 0 | (¹) | 0.44 |
| 0.100 | 0.220 | 10 | 13.0 | 0.78 |
| 0.050 | 0.115 | 15 | 20.4 | 1.30 |
| 0.050 | 0.120 | 20 | 34.3 | 2.24 |
| 0.050 | 0.125 | 25 | 35.2 | 2.31 |
|  |  |  | Unnotched |  |
| 0.050 | 0.110 | 10 | 6.6 | 0.72 |
| 0.050 | 0.115 | 15 | 10.5 | 1.27 |

¹ Not measured.

The unnotched impact strength was measured on a specimen 9 mm. wide and 3 mm. thick resting horizontally (with the narrow face uppermost) against two supports 38 mm. apart. The specimen was struck centrally on the wide face by a horizontally moving pendulum falling from 305 mm., with normally sufficient energy to break the specimen. From the residual energy of the pendulum, the energy required to break the specimen was calculated and then divided by the cross-sectional area of the specimen. The resulting value (expressed in kJ/m.$^2$) represents the energy required to cause cracks and brake the material.

In the notched impact strength test, carried out at 20° C., a specimen 51 mm. long, 6.3 mm. wide, and 3 mm. thick was given a 45° notch 2.8 mm. deep (tip radius 0.25 mm.) in the centre of one edge. It was supported between two supports 38 mm. apart and struck centrally on the edge opposite the notch by a pendulum dropping from 305 mm. with more than sufficient energy to break the specimen. From the residual energy of the pendulum, the energy required to break the specimen was calculated and divided by the cross-sectional area of the specimen at the notch. The resulting value (expressed in kJ/m.²) represents the energy required to break the material.

We claim:

1. A thermoplastic polymer consisting essentially of recurring units of the formula

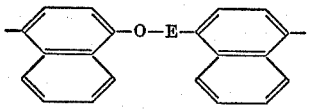

where E is a direct link or a group having the formula —X—O— where X is a bivalent non-polar residue selected from the group consisting of linear methylenes having the formula $(CH_2)_n$ where $n$ is 2 to 12, the alkyl and dialkyl derivatives thereof to a maximum of 20 carbon atoms, phenylene, naphthylene, biphenylylene and oxy- and alkane-bis(phenyl) residues.

2. A polymer according to claim 1 in which E is a direct link.

3. A polymer according to claim 1 in which E is a group having the formula —X—O— in which X has the formula

$(CH_2)_n$ where $n$ is an integer having the value 2 to 12.

4. A polymer according to claim 3 wherein $n$ is 3 or 5.

5. A polymer according to claim 1 in the form of moulding, film or fibre.

6. A process for the preparation of thermoplastic polymers consisting essentially of recurring units of the formula

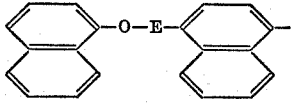

where E is a direct link or a group having the formula —X—O— where X is a bivalent non-polar residue selected from the group consisting of linear methylenes having the formula $(CH_2)_n$ where $n$ is 2 to 12, the alkyl and dialkyl derivatives thereof to a maximum of 20 carbon atoms, phenylene, naphthylene, biphenylylene and oxy- and alkane-bis(phenyl) residues which comprises reacting at least one bis-(1-naphthoxy) derivative of the formula

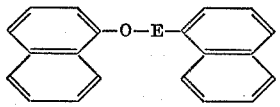

in the presence of an electrophile selected from the group consisting of ferric chloride, aluminum chloride, antimony chloride and benzene sulphonic acid and a hydrogen-abstracting oxidant selected from the group consisting of nitrobenzene, m-dinitrobenzene, cupric chloride and ferric chloride at a temperature of —50° C. to 60° C.

7. A process according to claim 6 in which the reaction is carried out at a temperature of —50° to 50° C.

8. A process according to claim 6 in which the bis-(1-naphthoxy) derivative is bis-(1-naphthyl) ether.

9. A process according to claim 6 in which both the electrophile and the hydrogen-abstracting oxidant are ferric chloride.

10. A process according to claim 6 in which the hydrogen-abstracting oxidant is selected from ferric chloride and cupric chloride.

11. A process according to claim 6 in which both the electrophile and the hydrogen-abstracting oxidant are present in molar concentration greater than that of the bis-(1-naphthoxy) derivative.

12. A process according to claim 6 which is carried out in the presence of a diluent.

13. A process according to claim 12 wherein the diluent is nitrobenzene.

No references cited.

MELVIN GOLDSTEIN, Primary Examiner

U.S. Cl. X.R.

280—30.8 DS, 32.4, 32.6 R, 33.2 R, 33.8 R

UNITED STATES PATENT OFFICE
CERTIFICATE OF CORRECTION

Patent No. 3,810,870  Dated May 14, 1974

Inventor(s) Ronald George Feasey et al.

It is certified that error appears in the above-identified patent and that said Letters Patent are hereby corrected as shown below:

In the heading, Foreign Application Priority Data should be added as follows:

--May 21, 1971   Great Britain .....16247/71--

Signed and sealed this 1st day of October 1974.

(SEAL)
Attest:

McCOY M. GIBSON JR.
Attesting Officer

C. MARSHALL DANN
Commissioner of Patents